US007957224B2

(12) United States Patent
Tremper

(10) Patent No.: US 7,957,224 B2
(45) Date of Patent: Jun. 7, 2011

(54) HUMAN ECHOLOCATION SYSTEM

(75) Inventor: Douglas Tremper, Sparta, NJ (US)

(73) Assignee: Lindsay Tremper, Sparta, NJ (US)

( * ) Notice: Subject to any disclaimer, the term of this patent is extended or adjusted under 35 U.S.C. 154(b) by 190 days.

(21) Appl. No.: 12/453,096

(22) Filed: Apr. 29, 2009

(65) Prior Publication Data

US 2010/0278012 A1    Nov. 4, 2010

(51) Int. Cl.
*G01S 15/93*    (2006.01)

(52) U.S. Cl. ............. 367/116; 367/909; 367/87; 367/99

(58) Field of Classification Search .................... 367/99, 367/116, 87, 909
See application file for complete search history.

(56) References Cited

U.S. PATENT DOCUMENTS

| 2,500,638 | A |   | 3/1950  | Krduth          |         |
|-----------|---|---|---------|-----------------|---------|
| 3,321,737 | A | * | 5/1967  | Russell         | 367/116 |
| 3,366,922 | A |   | 1/1968  | Kay             |         |
| 4,292,678 | A |   | 9/1981  | Kay             |         |
| 4,551,825 | A | * | 11/1985 | Biber           | 367/116 |
| 4,761,770 | A |   | 8/1988  | Kim et al.      |         |
| 4,907,136 | A |   | 3/1990  | Jorgensen       |         |
| 5,107,467 | A |   | 4/1992  | Jorgensen et al.|         |
| 6,011,754 | A | * | 1/2000  | Burgess et al.  | 367/116 |
| 6,469,956 | B1| * | 10/2002 | Zeng            | 367/116 |
| 6,798,715 | B2| * | 9/2004  | Harmon et al.   | 367/99  |
| 7,054,226 | B1|   | 5/2006  | Hickling        |         |

* cited by examiner

*Primary Examiner* — In J Lobo
(74) *Attorney, Agent, or Firm* — Thomas J. Germinario

(57) ABSTRACT

A human echolocation system emits toward a target a series of sound pulses beginning at a low frequency and progressing stepwise to a high frequency. Echoes of the pulses enable the user to estimate location, distance and dimensions of the target. Target location and distance are estimated based on a stretched echo delay, while target dimensions are estimated based on a musical pitch corresponding to the echo frequency.

9 Claims, 4 Drawing Sheets

HUMAN ECHOLOCATION SYSTEM

BACKGROUND OF THE INVENTION

The present invention relates to the use of acoustic echoes to achieve spatial orientation. More specifically, it deals with devices and techniques that utilize reflected acoustic signals to locate and identify objects. Such devices and techniques provide useful aids for blind individuals and for sighted individuals in dark environments.

The term "echolocation" refers to methods for using sound instead of light as a means of sensing the presence of objects and determining their location and distance from the observer. In nature, echolocation is used by several species—most notably bats and dolphins—as a means of orientation and in prey species identification in darkness. These animals emit high-pitched "clicks" from their mouths and then sense the returning echo. The direction that their head is pointed in when it emits an echoed click reveals the direction of an object in front of them, while the delay between the emitted click and the echo is proportional to their distance from the object.

The echo delay for reflected sound is very brief. Sound travels 340 meters-per-second (m/sec) in air and 1500 msec in water. So for a bat, the interval between the emitted click and the echo from an object 5 meters away is 29 milliseconds (ms), while for a dolphin the interval is only 7 ms. While the auditory organs and brains of bats and dolphins are equipped to distinguish sounds at these minute intervals, the human ear and brain cannot distinguish sounds at an interval of less than 100 ms. For that reason, echolocation systems designed for humans must involve some form of electronic processing of the echo delay to either "stretch" the delay interval or use an interference technique known as "heterodyning" to convert the echo signal into a series of beats. The stretching technique is used in the human echolocation systems taught by Kim et al., U.S. Pat. No. 4,761,770 and Jorgensen, U.S. Pat. Nos. 4,907,136 and 5,107,467. The heterodyning method is used in human echolocation systems disclosed by Kay, U.S. Pat. Nos. 3,366,922 and 4,292,678 and Hickling, U.S. Pat. No. 7,054,226.

An older echolocation system, taught by Krauth, U.S. Pat. No. 2,500,638, uses the echo delay interval to control the frequency of an audio oscillator, so that the user hears an audio signal that changes in pitch as the distance to the reflecting object varies.

A major disadvantage of all but one of these prior art human echolocation systems is that they give the user limited information relating only to the distance and location of an object. With the exception of the Hickling system, there is no capability of signaling the size or configuration of an object. And while the Hickling system has some capabilities with respect to distinguishing spatial features of an object, these capabilities come at the expense of a costly and delicate acoustic vector probe (AVP) and sophisticated digital processors.

Consequently, there is need, as yet unmet by the prior art, for a simple, inexpensive human echolocation system that can provide information not only as to the distance and direction of an object, but also its approximate size and dimensions. The simplest and most cost effective means of achieving this goal involves taking advantage of a property of sound that has thus far been overlooked by the prior art. The prior art devices all use only reflected sound as their source of object location—which is to say, they analyze only the sound that the object reflects. The present invention, however, derives information regarding the size and dimensions of an object based on analysis of the sound that the object does not reflect.

The scientific principle underlying the present invention is a property of sound known as "diffraction". Sound waves can bend themselves around objects, provided that the wavelength of the sound is larger than the size of the object. This explains why low frequency (long wavelength) sounds travel much further than high frequency (short wavelength) sounds. The short wavelength sounds are reflected back from objects in their path, while the long wavelength sounds are able to diffract around the same objects and keep going. This is why distant thunder sounds like a dull thud (low frequency, long wavelength), but close thunder sounds like a crack (high frequency, short wavelength).

One reason that the prior art has been unable to take advantage of sound diffraction is that it has followed the model of bat echolocation rather than that of dolphin echolocation. Bats use echolocation primarily to locate and identify the insects on which they feed. In order to distinguish a tasty moth from an unsavory one, for example, the bat may need to detect moth features in the size range of a few millimeters (mm). To achieve echolocation resolution at that level of detail requires very high sound frequency, because lower frequency sounds will not reflect from such miniscule features, but will instead diffract around them. For example, to detect the distinctive antennae of its preferred moth prey, which may only be about 3 mm wide, the bat needs to emit its click at a frequency of about 100,000 cycles-per-second, or 100 kiloHertz (kHz).

The range of echolocation frequencies used by bats is actually between 14 kHz and 100 kHz, which corresponds to a size/wavelength range of about 24 mm down to about 3 mm. In fact, each species of bat has its own "signature" echolocation frequency, based on the dimensional characteristics of its choice insect prey. The disadvantage of this type of high resolution echolocation is that it's incapable of directly gauging the size and dimensions of larger objects. The bat's ability to orient itself with respect to objects larger than insects depends of its motion through the air. By flying around a larger object and rapidly taking numerous echolocation readings, the bat comes to know the size and extent of the object it's dealing with.

This is why echolocation systems based on the bat are inherently ill-suited to humans, and particularly to blind humans. It's not only that humans can't fly like bats, but their mobility is much more restricted, especially in the case of blind people. Even if humans could maneuver around objects rapidly enough to take the numerous echolocation readings needed to gauge the size of an everyday object, the human brain lacks the capacity of the bat brain to interpret this information without the aid of expensive data processing devices.

All of the prior art echolocation systems follow the bat model insofar as they deploy only ultrasound frequencies—that is, sound frequencies above the upper human audible limit of 20 kHz. But 20 kHz ultrasound will reflect off any object 17 mm or larger, so its echoes can reveal nothing about the dimensions of everyday objects.

The present invention, on the other hand, patterns itself on the echolocation system used by dolphins. Instead of emitting clicks in a single ultrasound frequency, the way bats do, dolphins emit a rapid series of clicks spanning a frequency range from audible to ultrasonic—typically 200 Hz to 150 kHz. These broad-band pulses enable a dolphin to determine the size of objects in the range from 7.5 m down to 10 mm.

When a dolphin is approaching another fish, for example, it may start by emitting low frequency clicks and then increase the frequency until it detects an echo from the target. If the dolphin begins to detect echoes at a frequency of 375 Hz, it knows that it's approaching a fish that's about 4 m long—perhaps a shark or other large predator—and the dolphin will swim away from danger. If, on the other hand, the dolphin begins to detect echoes at a frequency of 3 kHz, it knows it's approaching a fish that's about a 0.5 m long—small enough to provide the dolphin's next meal. The dolphin can then further investigate its potential prey by emitting higher frequency clicks. For instance, the dolphin might emit 10 kHz clicks toward the front of the prey to detect the tentacles of a cuttlefish, one of its favorite foods.

The present invention utilizes the dolphin echolocation model for its human echolocation system. As further described herein, the present invention is a device that emits toward a target object a series of sound bursts or pulses, beginning at a low frequency and progressing stepwise through higher frequencies. In determining the size of the target object, a process of elimination is employed based on frequencies that are not reflected from the object, but instead diffract around it. For example, if the pulse frequency has progressed up to 200 Hz with no detected echo, then the target object must be smaller than 1.7 m. On the other hand, if an echo is detected at the lowest audible frequency of 20 Hz, then the target object must be 17 m or larger.

Once the device has run through this process of elimination, the first echoed frequency will indicate the overall size of the target object. So, if the first echoed pulse is 340 Hz, then the target object will have a maximum dimension of 1 m. Knowing this, the user can proceed to use higher frequency pulses aimed at specific parts of the target object to explore its configuration in greater detail. For example, the 1 m target object may be a 40-inch flat panel television screen. By aiming higher frequency pulses toward the bottom of the screen, the user may hear echoed pulses of 1 kHz, indicating the presence of a 0.3 m column supporting the screen.

Therefore, the present invention has all of the capabilities of the prior echolocation art in terms of determining the location of a target object, while adding the additional capability of also determining the overall size and detailed configuration of the target object as well. The present invention also provides these capabilities without the need for expensive, bulky and delicate directional transponder arrays and/or data processing units. Hence, the present invention affords an economical, compact, durable and easy-to-use device for human echolocation.

SUMMARY OF THE INVENTION

The present invention is a device worn by the user that emits a series of pulses in a range from audible sound to ultrasound. In recurring cycles, a transmitter emits a series of pulses, beginning at the low frequency (long wavelength) end of the range, and then progressing stepwise to the high frequency (short wavelength) end of the range. The device has two receivers, located on the right and left sides of the device, which transmit audible signals for the right and left ears of the user, thus enabling binaural hearing. For each transmitted frequency, the user hears an initial "beep" as the signal is transmitted and then an echoed "beep" indicating reflection from an object. The time interval between the transmitted pulse and the echoed pulse is stretched, in accordance with known signal processing methods, so as to be discernable to human hearing. Pulses in the audible range (20 Hz to 20 kHz) are heard by the user at their actual pitch, while ultrasonic pulses are proportionately converted to audible frequencies by methods known in the art.

A user wears the device on his/her head and gauges distance to a target object from the time interval between "beeps" as well as the relative loudness of the echoed "beep". The interval between "beeps" is directly proportional to the distance to the target object, while the relative loudness of the echoed "beep" is inversely proportional to the square of that distance. The user determines the location of the target object by turning his/her head until the "beeps" heard in each ear are the same in terms of delay intervals and loudness. The user senses the size of the target object based on the pitch of the echoed "beep". For large objects, the echoed "beep" will have a low pitch, corresponding to the long wavelength of the reflected sound, while for small objects, the echoed "beep" will have a high pitch, corresponding to the short wavelength of the reflected sound.

If there are multiple objects within the beam angle of the emitted pulses, there will be multiple echoes. Going back to the example of the 40-inch television screen, let us consider a scenario in which the screen is 3 m in front of the user, and 3 m behind it is a 6 m wall. As the transmitter progresses upward in frequency, the user will first hear a 57 Hz echoed "beep", corresponding to the reflection from the rear wall. Next, the user will hear a 340 Hz echoed "beep" from the television screen. The time interval between the transmitted "beep" and the echoed "beep" (hereafter referred to as the "echo delay") will be twice as long for the wall echo as for the television echo, and the latter will be four times as loud as the former.

If the user's head is turned at an oblique angle with respect to the television screen, he/she will hear a different echo delay and loudness for the 340 Hz echoed "beep" in each ear. Let us consider a situation in which the user's face is turned toward the left side of the screen. In this case, reflected sound will take longer to reach the left receiver than the right, and the user will hear in his/her left ear an echoed "beep" that is more delayed and softer than that heard in the right ear. This binaural difference cues the user to turn his/her face rightward until the left and right echoed "beeps" conform. At that juncture, the user's face is oriented toward the center of screen, and the transmitted sound pulses are likewise directed at the center of the screen.

Once the user has centered the transmitted pulses on the target object, upward and sideward movements of the user's head can be used to measure the dimensions of the object. Using the example of the television screen, let's say that it's 40 inches wide by 20 inches high, which is 1 m by 0.5 m. If the user is standing 3 m from the screen, the screen will subtend apparent angles of approximately 10 degrees vertically and 20 degrees horizontally. Accordingly, if the user, after centering on the screen, elevates or lowers his/her head by more than 5 degrees, the transmitted pulses will bypass the screen and the 340 Hz echoed "beep" will no longer be heard. And the same will happen if the user turns his/her head to either side by more than 10 degrees.

By thus turning his/her head, therefore, the blind user gets a sense of the dimensions of the object he/she is "looking at", in much the same way as a sighted human gets a sense of the size of a distant objects by the apparent angle occupied by the object in their vision field. This is another example of how the present invention, unlike the prior art, can derive dimensional information not just from the detection of echoes, but also from the absence of echoes.

Returning again to our television screen example, after gauging the screen's dimensions, the user may wish to know if there's a power cord extending from the screen that might present a tripping hazard. Such a cord might only be a quarter-inch or 6 mm wide. To detect an object at this small scale, a pulse frequency of 57 kHz is needed. But, since the upper threshold of human hearing is 20 kHz, the user is not able to hear a 57 kHz ultrasonic pulse directly. Accordingly, the device proportionately reduces the frequency of ultrasonic pulses to the audible range. If a reduction factor of 90% is applied, the user will hear a 5.7 kHz echoed "beep" when the power cord is detected. Unless a special "signature" is added to the ultrasonic echoed "beep", however, it will confused by the user with the normal 5.7 kHz echo associated with a 60 mm object. For that reason, the processing of transmitted and echoed ultrasonic pulses in the present invention includes a "signature" modification to the sound of the "beep". This may in done in a number of ways, without changing the pitch of the "beep". One way would be to prolong the duration of the processed ultrasonic "beeps" as compared with "beeps" in the audible range.

With practice, the user will learn to associate size with the pitch of echoed "beeps", both in audible and ultrasonic frequencies. Size will be perceived in terms of musical notes. For example, our 40-inch television screen with its echo of 340 Hz will sound like the note F4, while the 57 Hz echoed "beep" from the rear wall will sound like A#1. These notes will be readily distinguishable, since they are more than two octaves apart. But, beyond mere distinction, over time the user will come to recognize the note F4 as representing an object measuring about 1 m, while A#1 stands for an object with a span of about 6 m. Indeed, each frequency from the lower to upper transmitting frequency of the device will become associated with a musical note that the user will learn to translate into an object size.

Having described the general concepts of the present invention, it is understood that the invention may be realized in a number of possible embodiments. While one of these embodiments has been selected to illustrate in more concrete form how this invention may be practiced, it is understood that the following detailed description is presented for exemplary purposes only and does not limit the scope of the present invention or the claims made in relation thereto.

DETAILED DESCRIPTION OF THE PREFERRED EMBODIMENT

Figure 1:
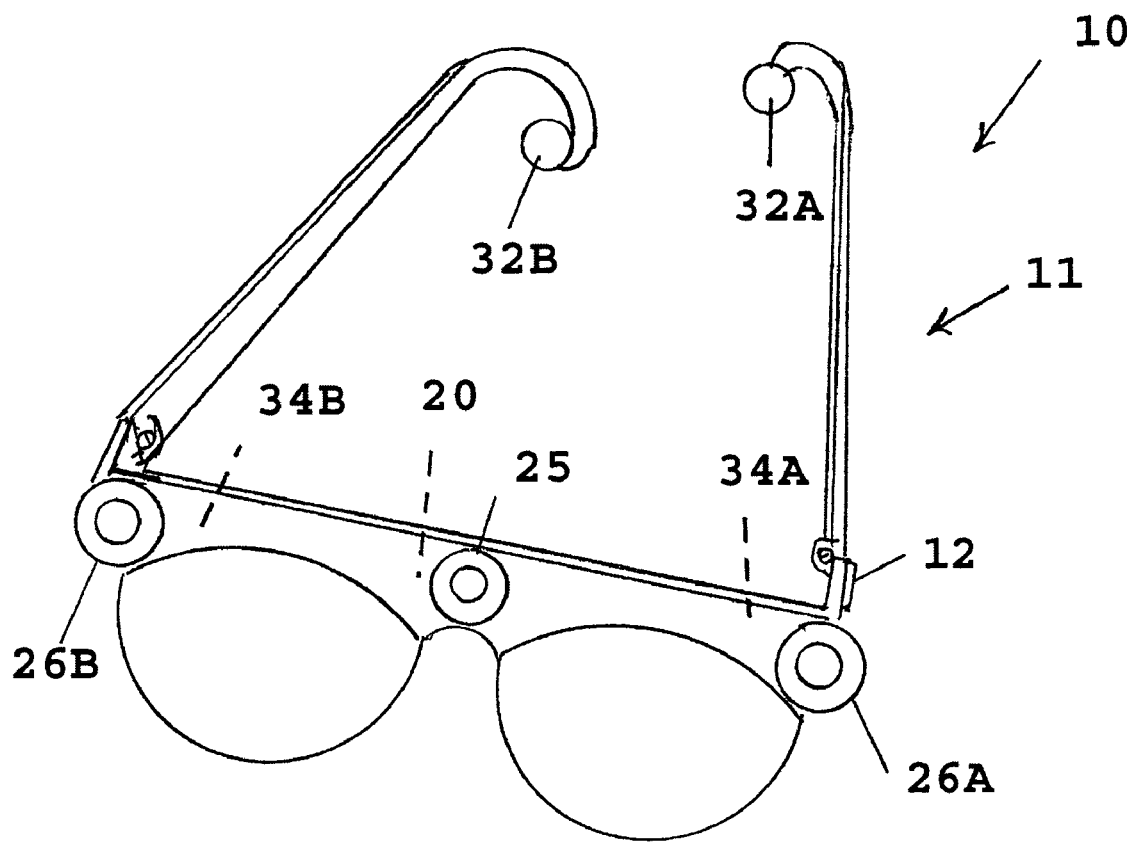
FIG. 1 is a perspective view of a human echolocation system in accordance with the preferred embodiment of present invention.

Referring to FIG. 1, the preferred embodiment of the present invention 10 comprises a specially equipped pair of glasses or sunglasses 11. Built into the frame of the glasses 11 is an on/off switch 12, which controls the power to the echolocation system. Also built into the frame of the glasses are transmitter circuits 20 and a transmitter 25, which is centered on the front of the glasses 11. On either side of the front of the glasses 11, there are two receivers 26: a left receiver 26A and a right receiver 26B. The two receivers 26 are electrically connected to two corresponding receivers circuits 34: a left receiver circuit 34A and a right receiver circuit 34B. Optionally, a dual transmitter 25, having separate units for transmitting audible and ultrasonic pulses, can be used. Similarly, dual receivers 26 can be used for audible and ultrasonic echoes.

Audible signals corresponding to transmitted pulses and echoes are heard by the user through two headphones 32: a left headphone 32A and a right headphone 32B. The headphones 32 may be connected to the glasses 11 is the area where they attach to the user's ears, as shown in FIG. 1, or they may be wireless headphones that are inserted into the user's ears without connection to the glasses 11.

Figure 2:
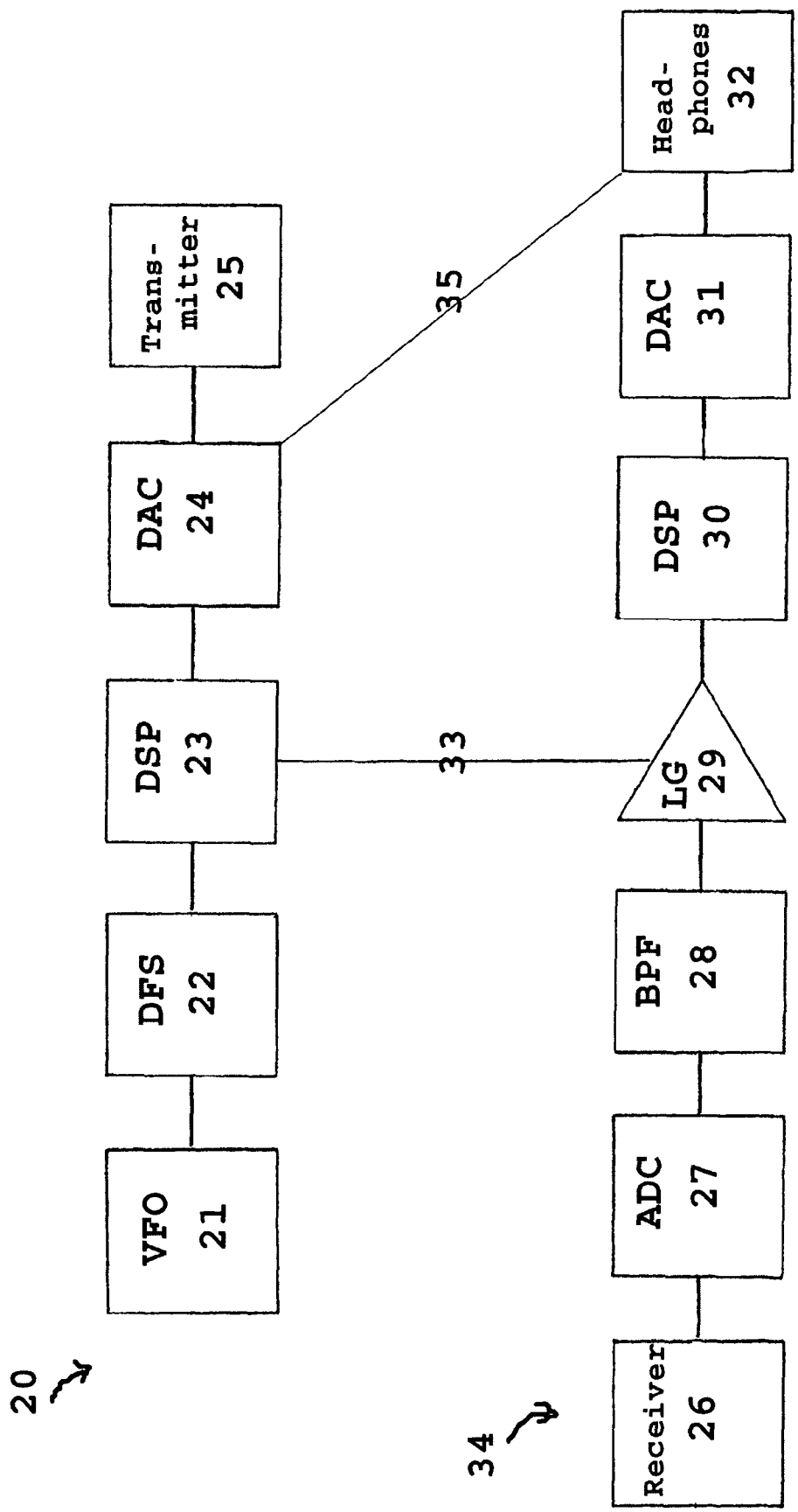
FIG. 2 is a block diagram of a human echolocation system in accordance with the preferred embodiment of the present invention.

The components of the transmitter circuits 20 and the receiver circuits 34 are shown in FIG. 2. The transmitter circuits 20 comprise a variable frequency oscillator (VFO) 21, a digital frequency synthesizer (DFS) 22, a digital signal processor (DSP) 23, and a digital-to-analog converter (DAC) 24. The variable frequency oscillator 21 generates an acoustic pulse at a frequency controlled by the digital frequency synthesizer 22. The acoustic pulse is then formatted in the desired signal configurations by the digital signal processor 23. These configured digital signals are then converted to analog signals by a digital-to-analog converter (DAC) 24. Finally, an analog transmission signal is sent to the transmitter 25, while an analog headphone signal 35 is sent to the headphones.

For exemplary purposes of the preferred embodiment 10, the digital signal processor 23 formats audible pulses (20 Hz-20 kHz) so as to be convertible to analog headphone "beeps" 35 having the same frequency as the transmission signal 25. When an ultrasonic signal above the audible range (>20 kHz) is transmitted, however, it is registered in a logic gate 29 that has an interface 33 with the digital signal processor 23, as shown in FIG. 2. For ultrasonic signals, the digital signal processor 23 configures digital signals that are convertible to analog headphone "rings" 35 having one-tenth the frequency of the transmission signal 25.

FIG. 2 also depicts one of the two receiver circuits 34. An analog echo signal generated by the receiver 26 is converted to a digital echo signal by an analog-to-digital converter (ADC) 27. The digital echo signal is then filtered of noise by a band-pass filter (BPF) 28 so as to pass only the portion of the echo signal having the same frequency as the transmission signal 25. When the transmission signal is audible, the logic gate 29 will be set to direct a digital signal processor (DSP) 30 to format the digital echo signal so as to be convertible, by a digital-to-analog converter (DAC) 31, to an analog headphone "beep" 32 having the same frequency as the echo signal 26. When the transmission signal is ultrasonic, the logic gate 29 will be set to direct the digital signal processor 30 to format the digital echo signal so as to be convertible, by the digital-to-analog converter (DAC) 31, to an analog headphone "ring" 32 having one-tenth the frequency of the echo signal 26.

In addition to formatting the digital echo signal as described above, the digital signal processor 30 stretches the echo delay by a factor (for exemplary purposes) of 100. Hence the 29 ms echo delay from an object 5 m away will be stretched to 2.9 seconds so that it's perceptible to human hearing. The digital signal processor 30 also amplifies the echo signal so that faint distant echoes are audible.

Figure 3:
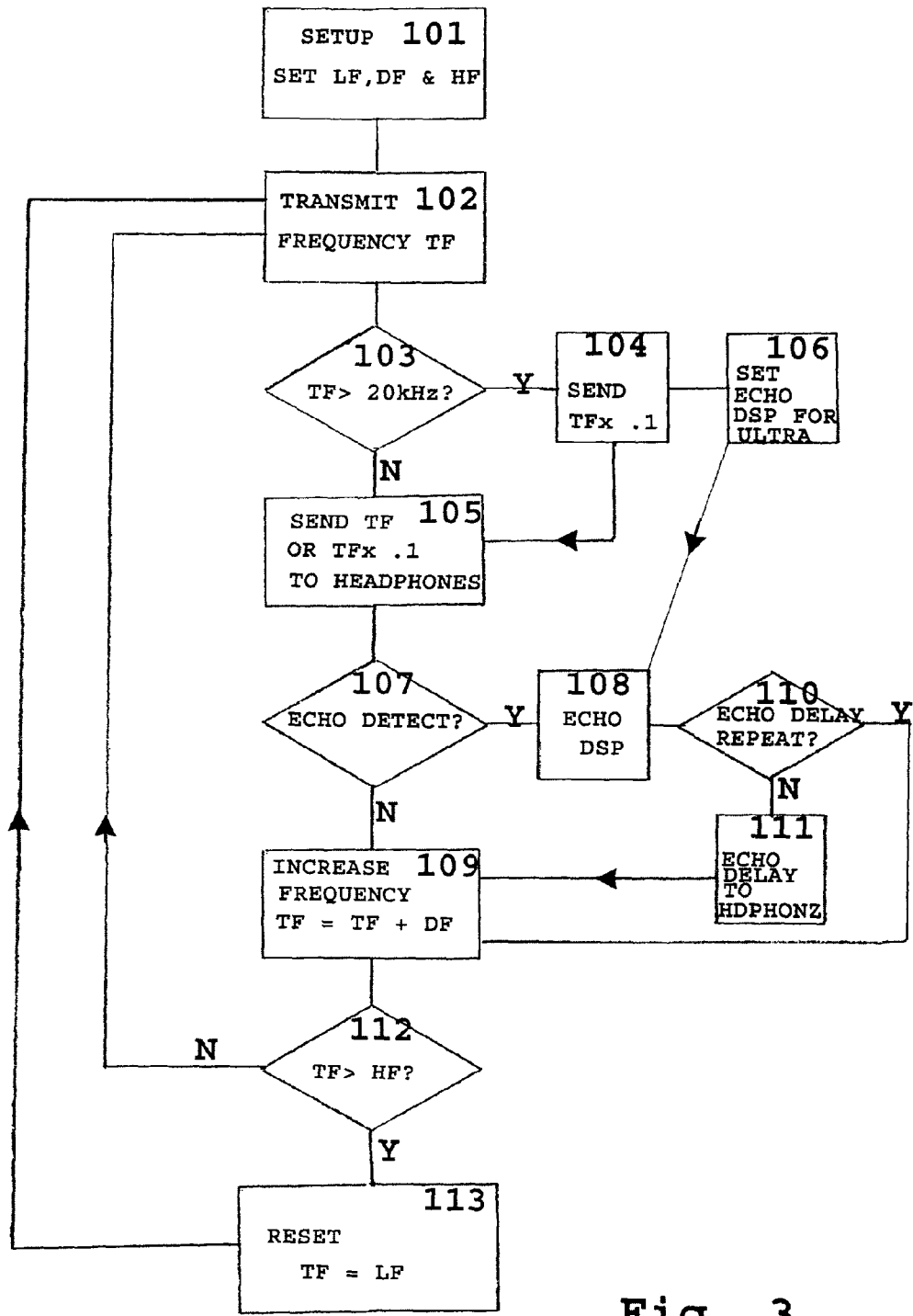
FIG. 3 is a flow chart depicting the operational features a human echolocation system in accordance with of the preferred embodiment of the present invention.

An operational flow-chart for the preferred embodiment is shown in FIG. 3. The user will begin with a setup step 101, in which he/she will set the range of sound transmission frequencies and the frequency increments. There are settings for a low frequency LF, an incremental frequency DF, and a high frequency HF. The transmission cycles begin 102 at a transmission frequency TF equal to the low frequency LF, and the incremental frequency DF is added to increase the transmission frequency TF stepwise 109 until the high frequency HF is reached 112/Y. Then the cycle begins again at the low frequency LF 113.

When the transmission frequency TF is audible 103/N, a "beep" at the transmission frequency TF is sent to the headphones 105. When the transmission frequency TF exceeds the audible limit of 20 kHz 103/Y, the frequency is reduced by a factor of ten 104, and a "ring" 106 at the reduced frequency is sent to the headphones 105.

When an echo is not received after a transmission 107/N, the transmission frequency TF is incremented by adding the incremental frequency DF 109, and a pulse at the new transmission frequency is sent 102, provided that the high frequency HF is not exceeded 112/N. When an echo is received after a transmission 107/Y, the echo signal is formatted by the digital signal processor 108. The format for an audible echo is a "beep" at the echo signal frequency, while the format for an ultrasonic echo is a "ring" at one-tenth the echo signal frequency 106/108. The digital signal processor 108 also stretches the echo delay by a factor of 100 (for exemplary purposes) and amplifies the echo signal.

If the same echo delay is not detected in two successive echo signals 110/N, then the echo signal is interpreted as coming from a newly targeted object, or one that is moving. In either case, th processed signal is sent to the headphones 111 so as to make the user aware of the object. If the same echo delay is detected in two successive echo signals 110/Y, then the echo signal is interpreted as coming from a previously targeted object at rest, and the processed signal is not sent to the headphones. In either case, the transmission frequency TF is subsequently incremented 109 and the cycle is repeated until the high frequency is exceeded 112, at which point entire process begins again at the low frequency 113/102.

Figure 4:
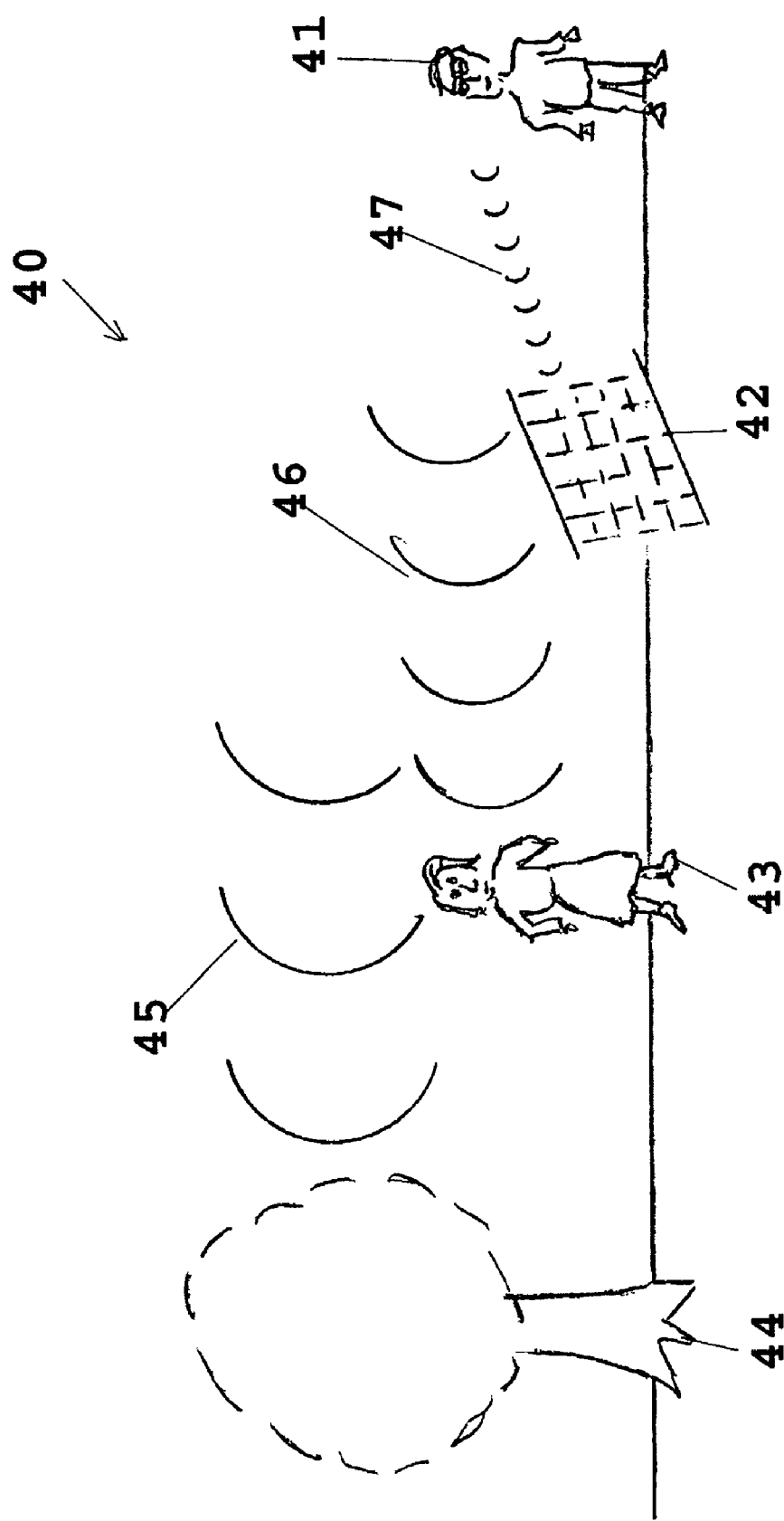
FIG. 4 is a schematic diagram illustrating an exemplary use of the preferred embodiment of the present invention in echolocation of objects.

FIG. 4 gives an illustration of how the device is used. In the illustrative field of view 40 there is a user 41 wearing the device. One meter in front of the user is a wire fence 42 consisting of 6 mm wire. One meter behind the fence stands a woman 43 who is 1.7 m tall, and one meter behind her stands a tree 44 that is 5 m tall. As the device cycles from low to high frequencies, the lowest transmission frequency 45 to produce an echo will be 68 Hz, which will be reflected from the tree 44. The user 41 will first hear a "beep" signal for the transmission, followed 1.8 seconds later by an echo "beep", with both "beeps" at the same pitch as the musical note C#2.

The next higher transmission frequency 46 to produce an echo will be 200 Hz, which will be reflected from the woman 43. The user will hear a "beep" signal for the transmission, followed 1.2 seconds later by an echo "beep", with both "beeps" at the same pitch as the musical G3. The highest transmission frequency 47 to produce an echo will be 57 kHz, which will be reflected from the wire fence 42. The user will hear a "ring" signal for the transmission, followed 0.6 seconds later by an echo "ring", with both "rings" at the same pitch as the musical F8.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A method of echolocation practiced by a human operator, comprising the steps of:
   (a) emitting toward one or more target objects a series of discrete sound transmissions, wherein each sound transmission in the series has one discrete transmission frequency, and wherein the series begins at a selected low frequency in the audible range and progresses by a selected fixed frequency increment through a plurality of increasing transmission frequencies to a selected high frequency;
   (b) for a non-large target object having dimensions smaller than the wavelength corresponding to the low frequency, initially detecting an absence of echoes, wherein diffraction causes the sound transmissions not to reflect from the target object until the series of sound transmissions progresses to a threshold frequency corresponding to a wavelength equal to the maximum dimension of the target object;
   (c) for a large target object having a maximum dimension greater than or equal to the wavelength corresponding to the low frequency, using one or more reception means to receive from the large target object an echo at the low frequency;
   (d) upon the series of sound transmissions progressing to the threshold frequency, using one or more reception means to receive from the non-large target object an echo at the threshold transmission frequency;
   (e) for a large target object, detecting an echo delay between the time of the emission of the low frequency and the time of the reception of the echo at the low frequency;
   (f) for a non-large target object, detecting an echo delay between the time of the emission of the threshold frequency and the time of the reception of the echo at the threshold frequency;
   (g) stretching the echo delay by a stretch factor to produce a stretched echo delay discernable to human hearing;
   (h) using one or more audio processing means to process the sound transmission so as to generate a first audible signal, having a signal format and a signal pitch, wherein the signal pitch of an audible sound transmission corresponds to the transmission frequency, and wherein the signal pitch of an ultrasonic sound transmission corresponds to the transmission frequency proportionately reduced by a reduction factor, and wherein the signal format generated for an ultrasonic sound transmission is audibly distinguishable from the signal format generated for an audible sound transmission;
   (i) using the audio processing means to process the echo so as to generate a second audible signal, having the same signal format and the same signal pitch as the first audible signal, wherein the second audible signal follows the first audible signal by a time interval equal to the stretched echo delay;
   (j) estimating by the human operator of the target distance based on the stretched echo delay, wherein the stretched echo delay corresponds to a target distance equal to one-half the speed of sound multiplied by the stretched echo delay divided by the stretch factor, and wherein, with repetitive practice, the human operator learns to associate the duration of the stretched echo delay with an approximate target distance;
   (k) estimating by the human operator of the maximum dimension of the target object based on the signal pitch, wherein the maximum dimension of the non-large target object equals the speed of sound divided by the threshold frequency, and wherein the maximum dimension of the large target object equals or exceeds the speed of sound divided by the low frequency, and wherein, with repetitive practice, the human operator learns to associate the signal pitch with an approximate maximum dimension of the target object;

(l) continuing to incrementally increase the transmission frequency in accordance with step (a), and repeating steps (b) through (k) for each target object; and (m) upon the transmission frequency reaching the high frequency, completing a current system cycle and performing a succeeding system cycle by repeating steps (a) through (l).

2. The method according to claim 1, wherein the reception means comprises two receivers, a right receiver and a left receiver, and wherein the audio processing means generates the second audible signal binaurally in a right channel and a left channel, such that the receivers can be oriented toward the target object by equalizing the binaural second audible signals of the right and left channels in terms of their respective stretched echo delays and/or their respective volumes.

3. The method according to either one of claim 1 or 2, wherein the estimating of the target distance is also, or alternately, based on the relative volume of the second audible signal as compared to the volume of the first audible signal, wherein the relative volume decreases proportionately to the square of the target distance.

4. The method according to either one of claim 1 or 2, comprising the additional step of estimating one or more dimensions of the target object by directing the reception means at various angles vertically and/or horizontally toward the target object so as to determine, by the presence or absence of echoes, one or more apparent angles horizontally and/or vertically subtended by the target object.

5. The method according to claim 3, comprising the additional step of estimating one or more dimensions of the target object by directing the reception means at various angles vertically and/or horizontally toward the target object so as to determine, by the presence or absence of echoes, one or more apparent angles horizontally and/or vertically subtended by the target object.

6. The method according to either one of claim 1 or 2, comprising the additional step of providing a repeat echo filter, which causes the audio processing means to generate first and second audible signals in each system cycle only for one or more initial target echoes, which are echoes at the lowest transmission frequency relative to subsequent echoes having the same echo delay.

7. The method according to claim 3, comprising the additional step of providing a repeat echo filter, which causes the audio processing means to generate first and second audible signals in each system cycle only for one or more initial target echoes, which are echoes at the lowest transmission frequency relative to subsequent echoes having the same echo delay.

8. The method according to claim 4, comprising the additional step of providing a repeat echo filter, which causes the audio processing means to generate first and second audible signals in each system cycle only for one or more initial target echoes, which are echoes at the lowest transmission frequency relative to subsequent echoes having the same echo delay.

9. The method according to claim 5, comprising the additional step of providing a repeat echo filter, which causes the audio processing means to generate first and second audible signals in each system cycle only for one or more initial target echoes, which are echoes at the lowest transmission frequency relative to subsequent echoes having the same echo delay.

* * * * *